US006373904B1

United States Patent
Sakamoto et al.

(10) Patent No.: US 6,373,904 B1
(45) Date of Patent: Apr. 16, 2002

(54) DIGITAL BROADCAST RECEIVING DEVICE

(75) Inventors: Noriya Sakamoto, Chigasaki; Masahiro Yamada, Kawasaki; Atsushi Hirota; Natsuki Koshiro, both of Yokohma; Eiichiro Tomonaga, Omiya; Tsukasa Kudo, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/119,737

(22) Filed: Jul. 21, 1998

(30) Foreign Application Priority Data

Jul. 22, 1997 (JP) .............................. 9-195731
Jul. 15, 1998 (JP) ........................... 10-200820

(51) Int. Cl.⁷ ............................................ H04N 5/44
(52) U.S. Cl. ...................... 375/316; 348/729; 348/730
(58) Field of Search ......................... 375/316; 348/725, 348/729, 730; 345/327; 713/320, 321, 323

(56) References Cited

U.S. PATENT DOCUMENTS

| 5,089,822 | A | * | 2/1992 | Abaunza et al. | ............... | 342/30 |
| 5,475,374 | A | * | 12/1995 | Moore | .................. | 340/825.22 |
| 5,768,604 | A | * | 6/1998 | Yamazaki et al. | ........... | 713/323 |
| 5,832,283 | A | * | 11/1998 | Chou et al. | ................... | 713/300 |
| RE36,189 | E | * | 4/1999 | Carter et al. | ................ | 713/324 |
| 6,065,123 | A | * | 5/2000 | Chou et al. | ................... | 713/322 |
| 6,097,378 | A | * | 8/2000 | Song | ........................... | 345/211 |
| 6,104,389 | A | * | 8/2000 | Ando | .......................... | 345/327 |
| 6,105,141 | A | * | 8/2000 | Hanlon et al. | .............. | 713/323 |
| 6,256,742 | B1 | * | 7/2001 | Konaka et al. | .............. | 713/320 |

* cited by examiner

Primary Examiner—Young T. Tse
(74) Attorney, Agent, or Firm—Pillsbury Winthrop

(57) ABSTRACT

A digital broadcast receiving device includes a first processor for extracting added information, a storage device for storing the added information, and a second processor having a low power consumption mode and a normal power mode, for effecting the circuit control for the watching and listening operation according to a preset program and the added information. The first processor informs the second processor that the added information is extracted, the second processor changes the mode thereof to the normal power mode when it is informed from the first processor that the added information is extracted while it is set in the low power consumption mode in the standby state, writes the added information extracted by the first processor into the storage device, and changes the mode thereof into the low power consumption mode after completion of the write operation.

12 Claims, 14 Drawing Sheets

DIGITAL BROADCAST RECEIVING DEVICE

BACKGROUND OF THE INVENTION

This invention relates to the improvement of a digital broadcast receiving device used in a digital broadcasting system.

Recently, the digital signal processing techniques for video and audio signals have markedly progressed and various systems are developed in various countries in the world to attain digital broadcasting services and a combination of the broadcasting and communication. Among them, the most important technique is the compression technique for video and audio signals. As the compression technique, MPEG, JPEG, H.261 are mainly used, for example. Particularly, the compression technique proposed by ISO/IEC13818-1 (Moving Picture Coding Experts Group (ISO/IEC JTC1/SC29/WG11)) is studied for international standardization of the broadcasting, communication and storage media.

In the ISO/IEC13818-1, not only a compressed video signal but also bit streams compressed for each data, audio signal and video signal of a program are multiplexed and broadcast and the content of a control portion for receiving a specified program is fixedly determined on the receiver side.

The multiplex control for bit streams in the broadcasting and communication of ISO/IEC13818-1 is briefly explained with reference to FIGS. 1 and 2.

FIG. 1 shows models of a video-i system and video-2 system in a packet forming method, and video data and audio data are first divided into one-frame units and headers are attached to the respective units to constitute PES (Packetized Elementary Stream). The length of PES is variable. Further, in order to multiplex video data and audio data on the time base, each PES is basically divided for every 184 bytes to make packets and a header of 4 bytes is added to each packet to make a TP (Transport Packet) of 188 bytes. FIG. 1 shows a case wherein video data and audio data are multiplexed, but in practice, added data of a program and data such as program information are formed into a TP form and multiplexed on the time base.

Next, a method for constructing a bit stream for broadcasting is explained with reference to FIG. 2.

In FIG. 2, programs A, B indicate one program, and they are output as TS(A), TS(B) in which a video-2 system, audio-2 system, ECM (Entitlement Control Messages)-1 system and program map table (PMT: Program Map Table) supplied for each program are multiplexed by multiplexing devices 1, 2. In this case, video, audio and ECM respectively indicate video data, audio data and added information data and PMT contains a packet ID for identifying video data, audio data and added information data and a description relating to the program. In TS(A), TS(B) of the programs A, B, a program association table (PAT), network information table (NIT), conditional access table (CAT), individual user key information (EMM (Entitlement Management Messages) information) which is necessary for watching and listening to the program and is supplied to the individual receiver and the like are multiplexed and output as a TS corresponding to transfer channel data.

In the above digital broadcasting system, in order to simplify the watching and listening management of subscribers, individual user key information is periodically updated on the transmitter side. Therefore, in order to rapidly start the watching and listening operation when the standby state is changed over to the watching and listening state, it is necessary to monitor the updating operation of the individual user key information on the receiver side. In this case, the troublesome condition can be coped with by maintaining the sub-power supply for a necessary circuit such as a processor for managing the individual user key information in the ON state, but this will wastefully consume power.

BRIEF SUMMARY OF THE INVENTION

As described above, if a method for maintaining the sub-power supply for a necessary circuit in the ON state is used to monitor the updating of added information on the receiver side in a case where added information such as individual user key information is periodically updated in a digital broadcasting system, power will be wastefully consumed.

An object of this invention is to provide a digital broadcast receiving device capable of updating added information while the power consumption is suppressed to minimum in the standby mode when digital broadcast in which added information is periodically updated is received and rapidly starting the watching and listening operation when the standby state is changed over to the watching and listening state.

A digital broadcast receiving device according to this invention comprises a first processor for extracting at least added information containing mail information or information used for watching and listening to a program and multiplexed on a digital broadcast signal from the broadcast signal; storage means for storing added information; and a second processor having a low power consumption mode and a normal power mode, for effecting the circuit control for the watching and listening operation according to a preset program and added information; wherein the first processor extracts the added information which meets a predetermined filter condition from the digital broadcast signal and informs the second processor that the added information is extracted, and the second processor is set into the low power consumption mode when the device is set in the standby state, and changed over to the normal power mode from the low power consumption mode when it is informed from the first processor that the added information is extracted, then the second processor transfers and writes the added information extracted by the first processor into the storage means after it is changed into the normal power mode, and is returned to the lower power consumption mode again after the writing operation of the added information is completed.

With the above construction, when the first processor extracts added information for watching and listening to the program from a digital broadcast signal in the standby state, it informs the second processor that the added information is extracted. Then, the second processor is changed over from the low power consumption mode to the normal power mode, transfers and stores the added information from the first processor into the storage means, and is then returned to the low power consumption mode again after completion of the storage of the added information.

As a result, since the second processor detects the added information in the standby state and is operated in the normal power mode only when the added information is stored into the storage means, the added information can be updated while the power consumption is suppressed to minimum, thereby permitting the watching and listening operation to rapidly start when the standby state is changed over to the watching and listening state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention with reference to the accompanying drawings.

Figure 1:
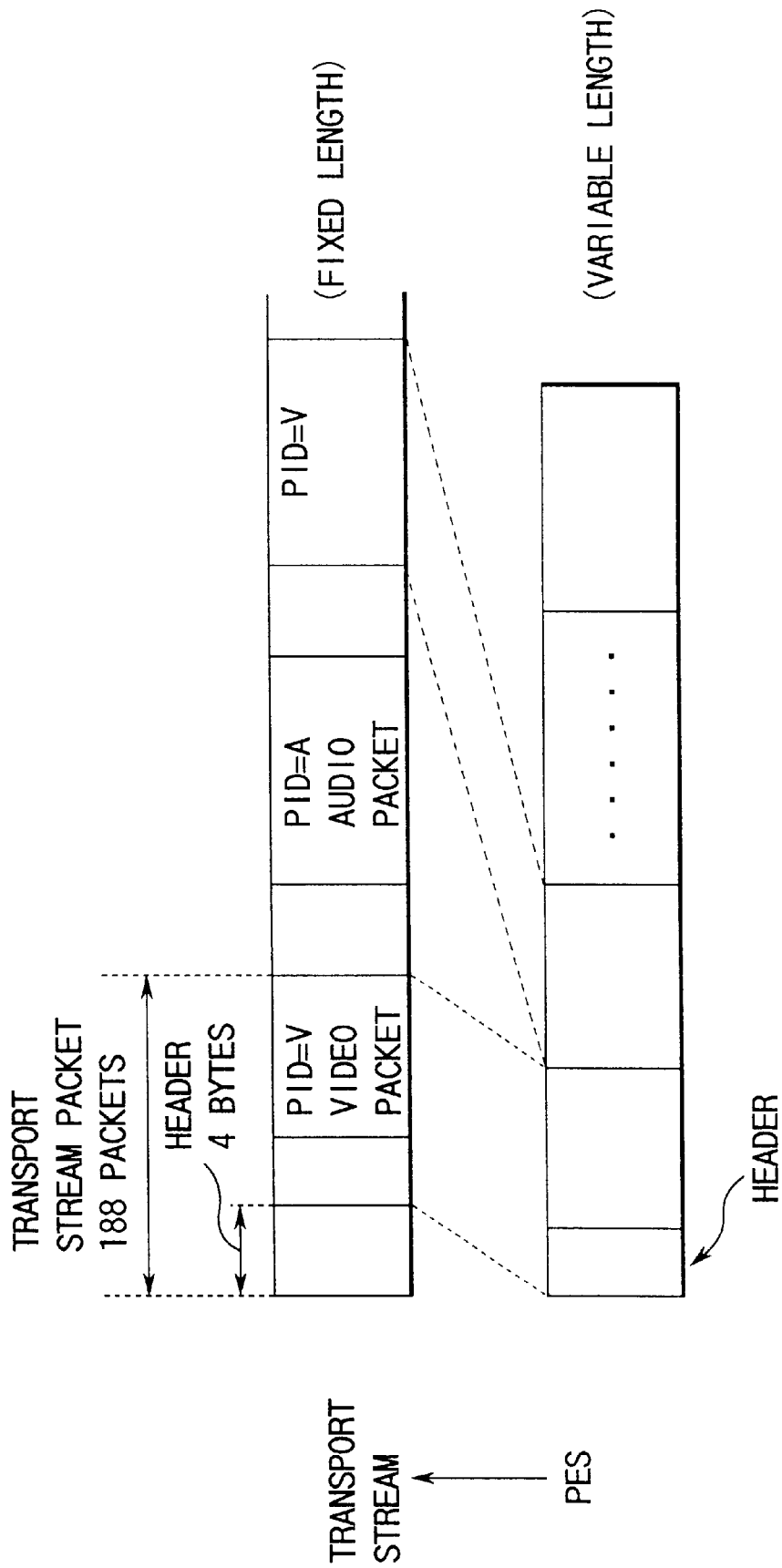
FIG. 1 is a diagram showing the packet construction of a system layer of ISO/IEC13818-1.
Figure 2:
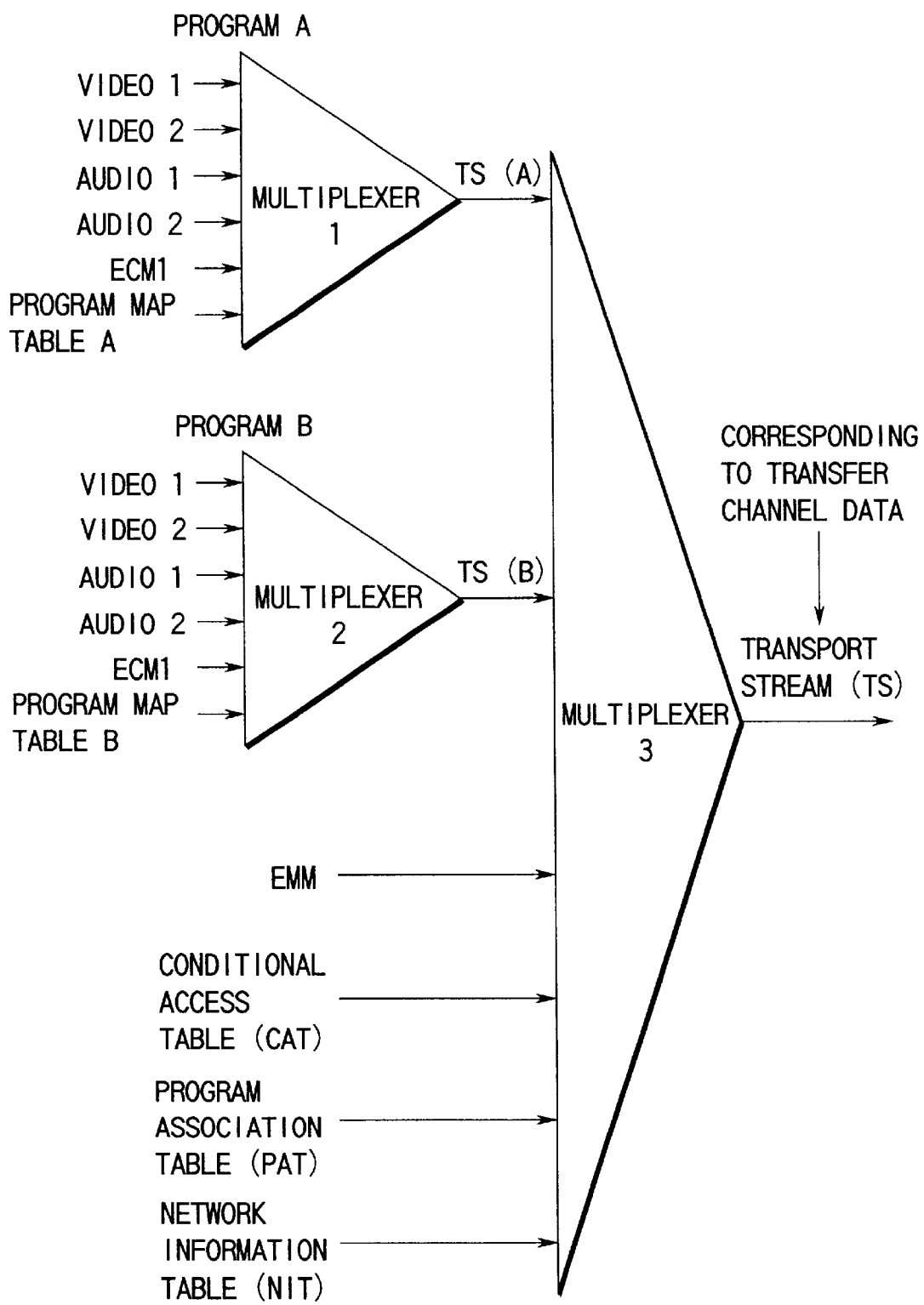
FIG. 2 is a block circuit diagram showing the construction of a system layer of ISO/IEC13818-1.
Figure 3:
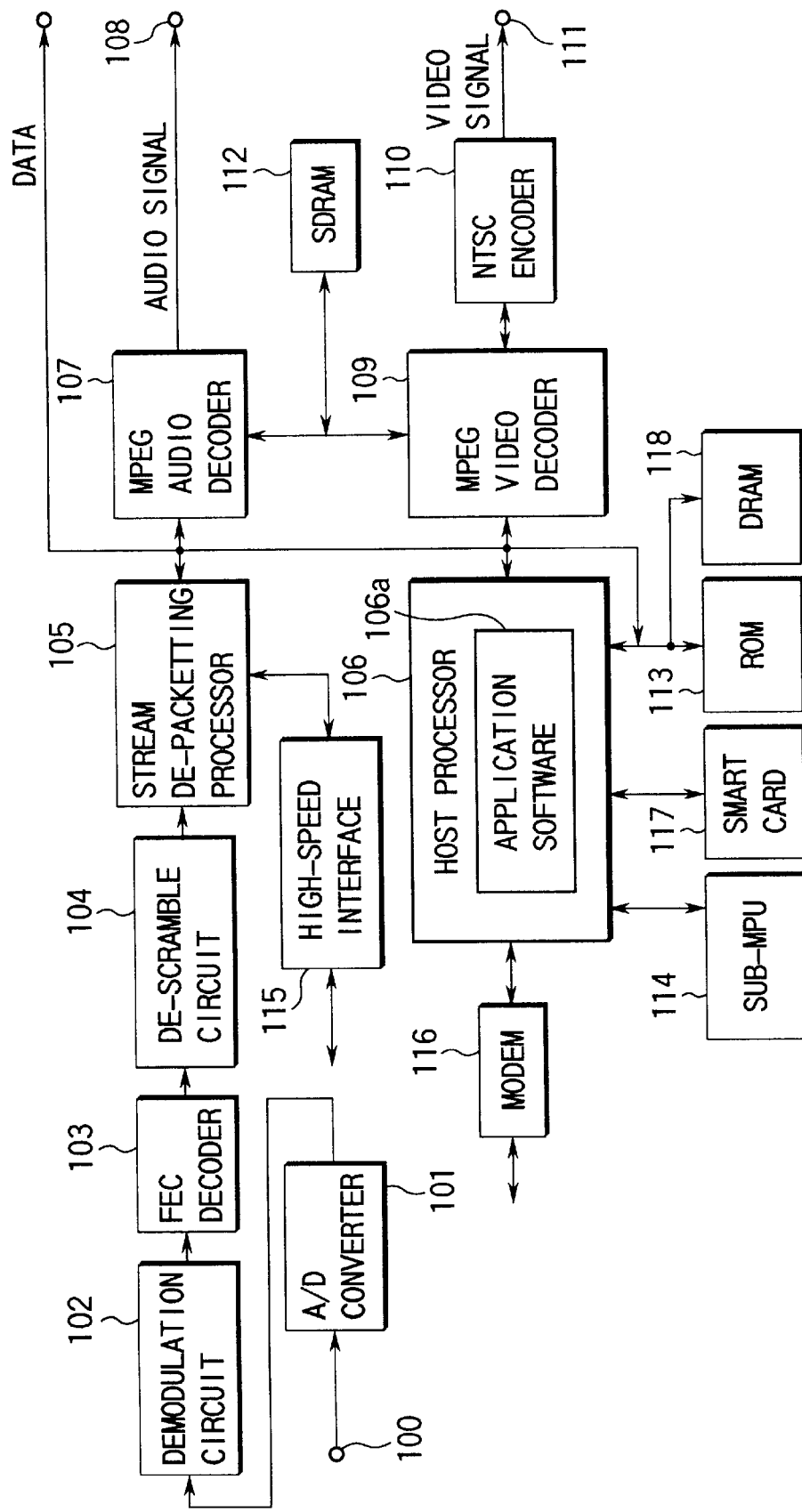
FIG. 3 is a block construction diagram showing one embodiment of a digital broadcast receiving device according to this invention.

FIG. 3 shows the construction of a digital broadcast receiving device which is one embodiment of this invention. In FIG. 3, a digital modulated broadcast signal such as a ground wave, BS (Broadcasting Satellite), CS (Communication Satellite) and CATV (Cable Television) is supplied to a terminal 100. The broadcast signal supplied to the terminal 100 is converted into a digital signal in an A/D converter 101, subjected to the demodulation process in a demodulation circuit 102, subjected to the FEC decoding process in an FEC decoder 103, and then supplied to a de-scramble circuit 104. The de-scramble circuit 104 is to de-scramble the output of the FEC decoder 103 and the output signal thereof is supplied to a stream de-packetting processor 105.

The stream de-packetting processor 105 effects the de-packetting process for a transport packet defined by ISO13818-1 and ETSI based on the output of the de-scramble circuit 104 and an audio PES signal in the signal subjected to the de-packetting process is transferred to an MPEG audio decoder 107 according to PDI specified by a host processor 106. The MPEG audio decoder 107 effects the decoding process for the transferred audio PES signal to convert the same into an audio signal and the audio signal is supplied to an audio reproducing device (not shown) via a terminal 108.

Further, among the signal subjected to the de-packetting process in the stream de-packetting processor 105, the video PES signal is transferred to an MPEG video decoder 109. Like the audio signal, the video PES signal is subjected to the decoding process in the MPEG video decoder 109, subjected to the encoding process in an NTSC encoder 110 and then output as a video signal to a monitor (not shown) via a terminal 111. At this time, an SDRAM 112 is used as a buffer for data of the MPEG audio decoder 107 and MPEG video decoder 109.

Further, added information and the like subjected to the de-packetting process in the stream de-packetting processor 105 are transferred to the host processor 106. The host processor 106 downloads the program from a ROM 113 at the time of turn-ON of the power supply switch and starts various types of application softwares 106a so as to effect the following control operation based on information which the viewer or listener inputs and which is supplied from a Sub-MPU (Micro Processing Unit) 114 and added information supplied from the stream de-packetting processor 105.

(1) The operation of inputting/outputting data to or from a high-speed interface 115 is controlled.

(2) Watching and listening record data is formed and the watching and listening record data is transmitted to the center of the provider by use of a modem 116.

(3) Data such as a response is transmitted by use of the modem 116 while interactive broadcast such as a questionnaire is received.

(4) Watching and listening record data is formed and held in a smart card 117 when the viewer utilizes the pay per view (PPV) system.

(5) When a scrambled program is received, key information of the program is drawn from the smart card 117 so as to permit the program to be watched and listened.

(6) Added information transmitted from the stream de-packetting processor 105 is held in a DRAM (Dynamic Random Access Memory) 118.

(7) Settings for effecting the de-packetting process are made for the stream de-packetting processor 105.

(8) The decoding processes of the MPEG audio decoder 107 and MPEG video decoder 109 are controlled.

(9) When EMM, ECM are acquired by the stream de-packetting processor 105, the version thereof is managed, and if the version is updated, the old information is replaced, information of an individual is extracted from EMM and information of the program is extracted from ECM and stored into the smart card 117 as key information.

(10) The period at which individual EMM is acquired is determined based on transmission period information of individual EMM and the timing of reception of the individual EMM.

The above digital broadcast receiving device has a watching and listening state in which the viewer watches and listens and a standby state in which the viewer stops watching and listening. In the watching and listening state, the power supplies of all of the circuits are turned ON to effect the viewable operation (normal operation), and in the standby state, the power supplies for circuits including the A/D converter 101 to the stream de-packetting processor 105 and the DRAM 118 are turned ON as in the watching and listening state to maintain the normal operation state. At this time, the host processor 106 is set in the low power consumption mode and the power supply for the other portion is set in the OFF state and may be turned ON when necessary to operate the corresponding portion.

The smart card 117 indicates a card defined by ISO7816 or a corresponding card. In the smart card 117, key information for permitting a specified program to be watched and listened is previously stored, and when the specified program is watched and listened by use of the key information, watching and listening record data of the specified program is written.

Further, the low power consumption mode of the host processor 106 indicates a mode in which the power consumption is lowered by partially interrupting the operation of the host processor 106, but the bus release request from the exterior can be accepted or a corresponding mode. The host processor 106 contains a timer for executing the periodic process.

Next, the operations of the stream de-packetting processor 105 and host processor 106 in the standby state are explained for each case.

Figure 4:
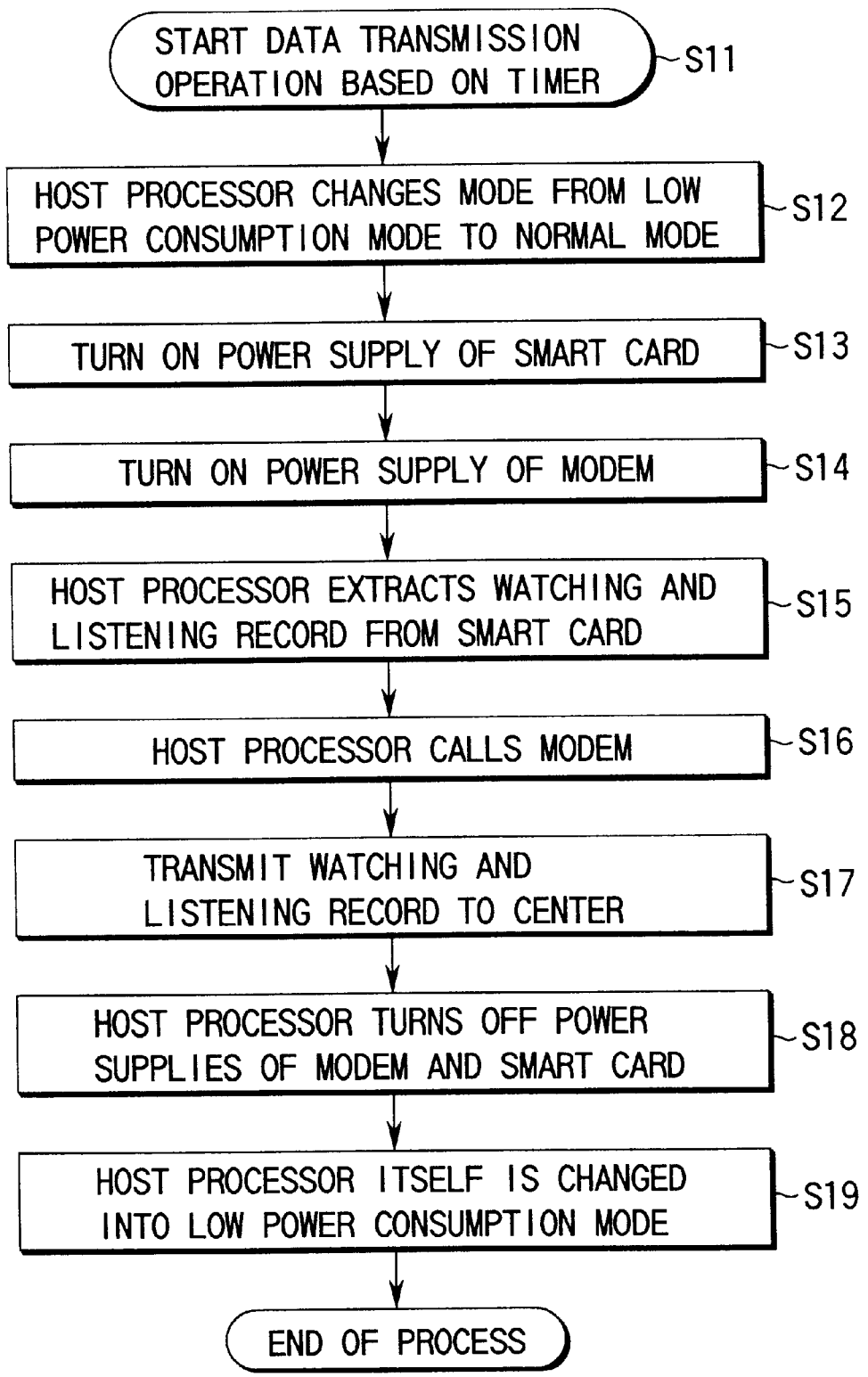
FIG. 4 is a flowchart for illustrating an example of the operation of a host processor effected when watching and listening record information stored into a smart card in the above embodiment is transferred to the center.

(1) In a case where watching and listening record data is informed to the center of the provider by use of the monitor 116, the host processor 106 performs the operation as shown in the flowchart of FIG. 4.

First, when the time previously specified by the timer is reached, the data transmission operation is started (step S11) and the mode is changed from the low power consumption mode to the normal power mode (step S12). Then, the power supplies of the smart card 117 and modem 116 are turned ON to set them into the operative state (steps S13, S14) and extract watching and listening record data from the smart card 117 (step S15).

Next, a call is issued to the modem 116 to connect the center to the communication line (step S16) and transmit the watching and listening record data extracted from the smart card 117 to the center side via the modem 116 (step S17). After this, the power supplies of the modem 116 and smart card 117 are turned OFF (step S18) to set the low power consumption mode again (step S19).

Figure 5:
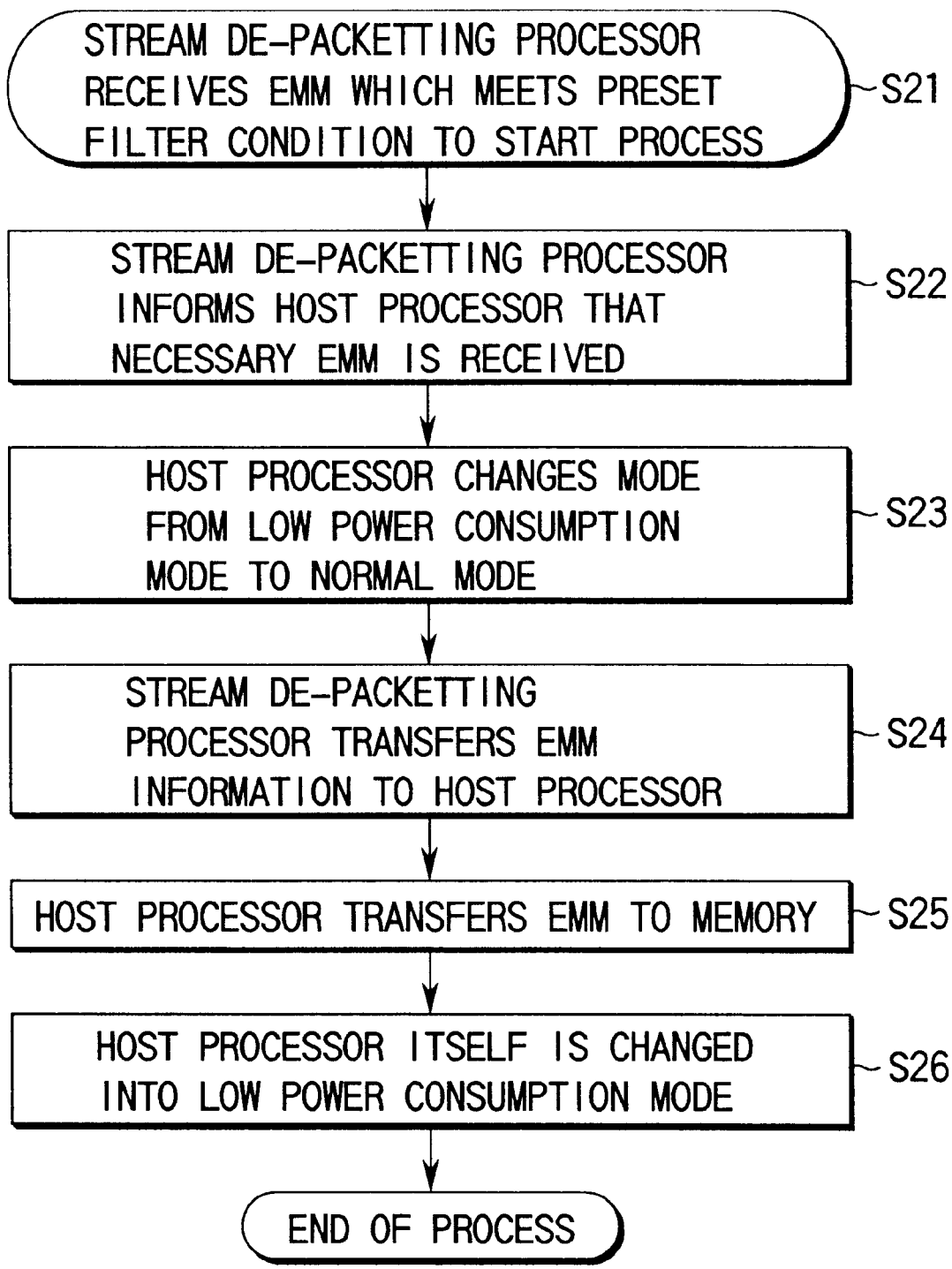
FIG. 5 is a flowchart for illustrating an example of the operation of the host processor effected when EMM information supplied from a stream de-packetting processor in the above embodiment is held in a DRAM.

(2) In a case where EMM information transmitted from the stream de-packetting processor 105 is held in the DRAM 118, the stream de-packetting processor 105 and host processor 106 perform the operation as shown in the flowchart of FIG. 5 as a method 1 for coping with the above operation.

First, when EMM information which meets the predetermined filter condition is received (step S21), the stream de-packetting processor 105 informs the host processor 106 that EMM information is received (step S22). The host processor 106 changes the mode from the low power consumption mode to the normal power mode in response to reception of the information (step S23), receives the EMM information from the stream de-packetting processor 105 (step S24) and writes the EMM information into the DRAM 118 (step S25). After this, the mode thereof is returned to the low power consumption mode (step S26) and the process is terminated.

Further, as a method 2 for coping with the above operation, the stream de-packetting processor 105 and host processor 106 may be operated as follows. First, when the receiving device itself is set into the standby state, the host processor 106 permits the stream de-packetting processor 105 to act as a bus master and is set into the low power consumption mode. When the stream de-packetting processor 105 receives EMM information in the standby state, it directly writes the EMM information into the DRAM 118. At this time, the host processor 106 maintains the low power consumption mode.

(3) In a case where mail information transmitted from the stream de-packetting processor 105 is held in the DRAM 118, the host processor 106 performs the following operation as a method 1 for coping with the above operation.

First, when it receives information that mail information is transmitted from the stream de-packetting processor 105, the mode thereof is changed from the low power consumption mode to the normal power mode. Then, it writes the mail information transmitted from the stream de-packetting processor 105 into the DRAM 118 and is set into the low power consumption mode again.

Further, as a method 2 for coping with the above operation, the stream de-packetting processor 105 and host processor 106 may be operated as follows. That is, when the receiving device itself is set into the standby state, the host processor 106 permits the stream de-packetting processor 105 to act as a bus master and is set into the low power consumption mode. In the standby state, the host processor 106 maintains the low power consumption mode and the stream de-packetting processor 105 directly writes mail information transmitted into the DRAM 118.

(4) In a case where the version of section data defined by ISO13818-1 and ETSI is updated, the host processor 106 performs the following operation as a method 1 for coping with the above operation.

First, when the host processor 106 receives information that section data of new version is received from the stream de-packetting processor 105, the mode thereof is immediately changed from the low power consumption mode to the normal power mode. Then, it writes section data of the new version transferred from the stream de-packetting processor 105 into the DRAM 118 and makes a setting for the stream de-packetting processor 105 for de-packetting and fetching section data of new version. After this, the mode thereof is returned to the low power consumption mode.

Figure 6:
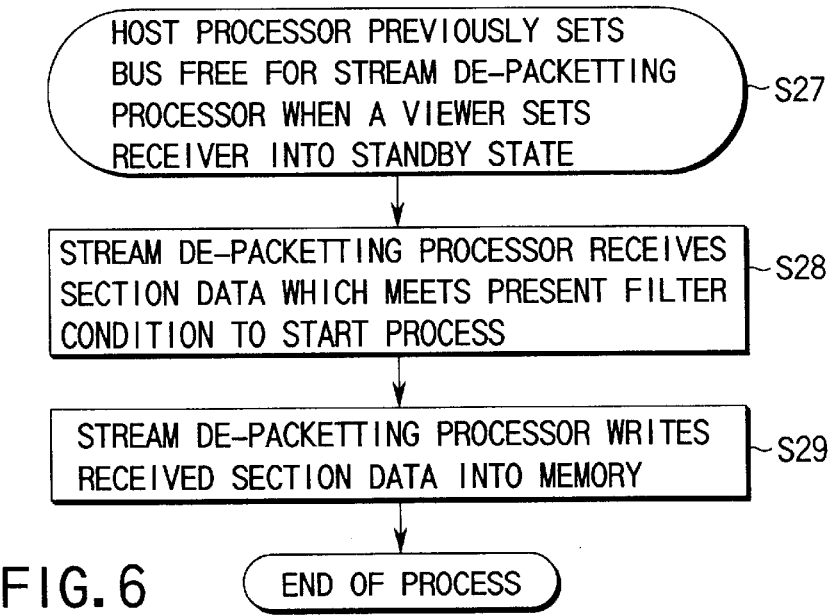
FIG. 6 is a flowchart for illustrating an example of the operation of the stream de-packetting processor effected when the version of section data in the above embodiment is updated.

Further, as a method 2 for coping with the above operation, the stream de-packetting processor 105 and host processor 106 may be operated as shown in the flowchart of FIG. 6.

First, when the receiving device itself is set into the standby state, the host processor 106 permits the stream de-packetting processor 105 to act as a bus master and is set into the low power consumption mode (step S27). When the stream de-packetting processor 105 receives section data of new version which meets the predetermined filter condition in the standby state (step S28), it writes the data into the DRAM 118 and makes a setting for de-packetting and fetching section data of new version (step S29). At this time, the host processor 106 maintains the low power consumption mode.

Figure 7:
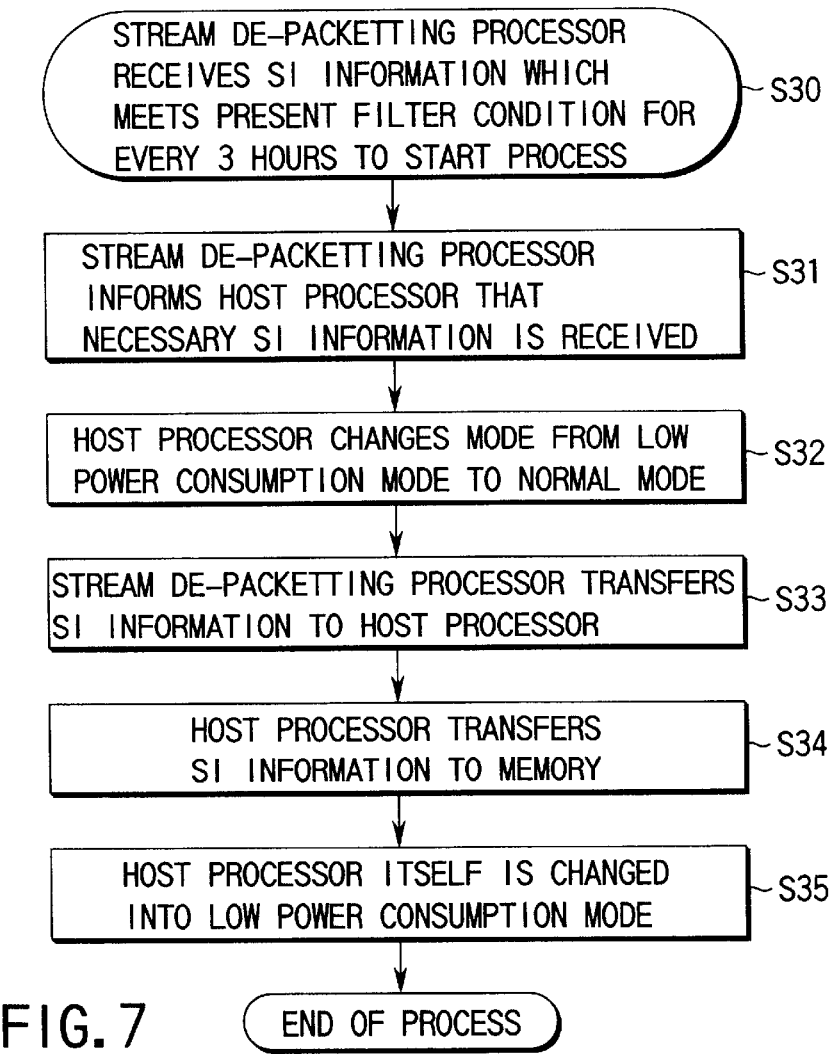
FIG. 7 is a flowchart for illustrating an example of the operation of the host processor effected when the version of event information table data in the above embodiment is updated.

(5) In a case where the version of event information table (EIT) data defined by ETSI is updated as a special example of the case (4), the stream de-packetting processor 105 and host processor 106 are operated as shown in the flowchart of FIG. 7 as a method 2 for coping with the above operation.

First, the stream de-packetting processor 105 receives SI (System Integration) information of new version which meets the predetermined filter condition, for example, for every 3 hours (step S30) and informs the host processor 106 that it has received the SI information (step S31). The host processor 106 changes the mode thereof from the low power consumption mode to the normal power mode in response to reception of the information (step S32).

Then, the stream de-packetting processor 105 transfers SI information of new version to the host processor 106 (step S33). The host processor 106 receives the SI information and stores the same into the DRAM 118, makes a setting for de-packetting and fetching section data of new version for the stream de-packetting processor 105 (step S34) and is then set to the low power consumption mode (step S35).

Figure 8:
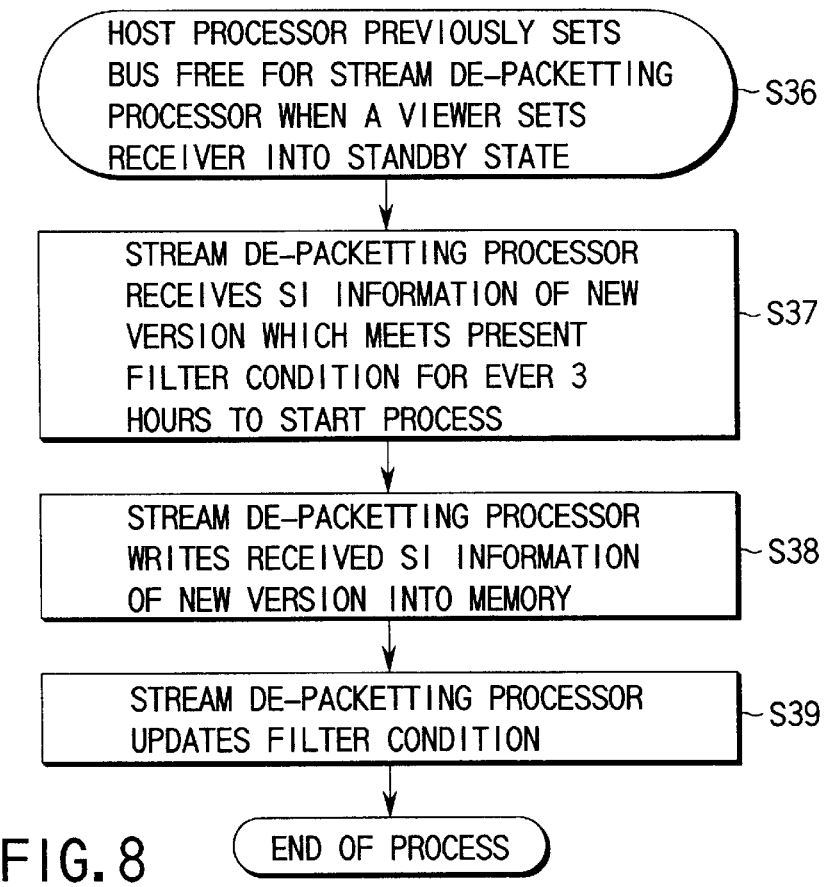
FIG. 8 is a flowchart for illustrating an example of the operation of the stream de-packetting processor effected when the version of event information table data in the above embodiment is updated.

Further, the stream de-packetting processor 105 and host processor 106 are operated as shown in the flowchart shown in FIG. 8 as a method 2 for coping with the above operation.

First, when the receiving device itself is set into the standby state, the host processor 106 permits the stream de-packetting processor 105 to act as a bus master and changes the mode thereof from the normal power mode into the low power consumption mode (step S36). In the standby state, the stream de-packetting processor 105 receives SI information of new version which meets the predetermined filter condition for every 3 hours and starts the signal processing operation (step S37). Then, it writes the received SI information of new version into the DRAM 118 (step S38) and makes a setting for de-packetting and fetching section data of new version (step S39). At this time, the host processor 106 maintains the low power consumption mode.

Figure 9:
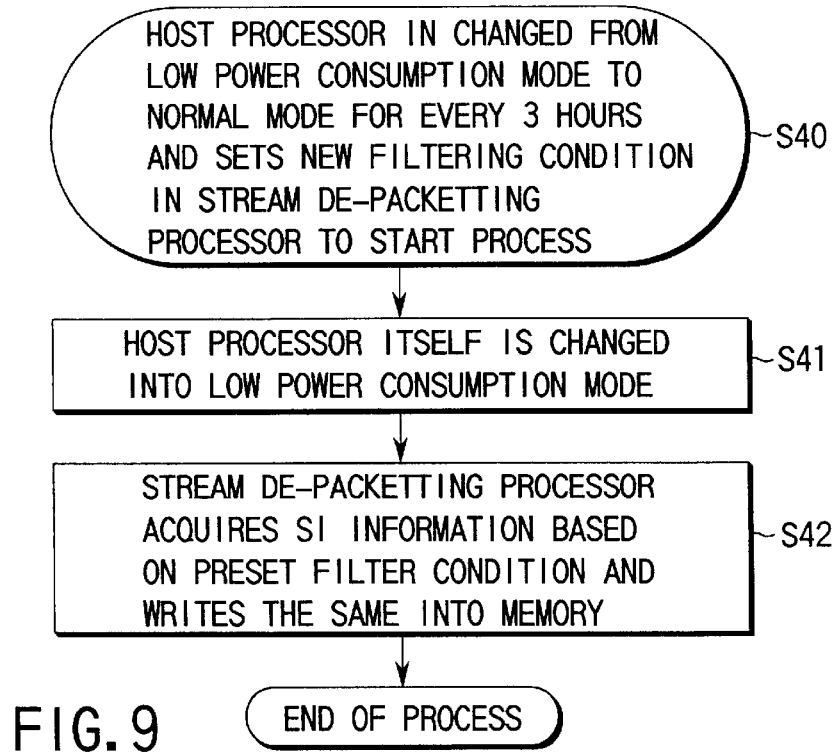
FIG. 9 is a flowchart for illustrating examples of the operations of the stream de-packetting processor and host processor effected when the version of event information table data in the above embodiment is updated.

Further, the stream de-packetting processor 105 and host processor 106 are operated as shown in the flowchart shown in FIG. 9 as a method 3 for coping with the above operation.

First, the host processor 106 changes the mode thereof from the low power consumption mode to the normal power mode for every 3 hours and sets a new filter condition in the stream de-packetting processor 105 so that ETI information can be acquired from the stream de-packetting processor 105 (step S40). Then, it receives ETI information thus obtained, updates the ETI information held in the DRAM 118 and then changes the mode thereof to the low power consumption mode again (step S41). After this, the stream de-packetting processor 105 acquires ETI information based on the thus set filter condition and directly writes the same into the DRAM 118 (step S42).

As described above, according to this embodiment, when the stream de-packetting processor 105 extracts mail information or EMM information for watching and listening to the program from a digital broadcast signal containing a video signal and audio signal in the standby state, it informs the host processor 106 that the EMM information or mail information is extracted. Then, the host processor 106 changes the mode thereof from the low power consumption mode to the normal power mode, transfers and stores the EMM information or mail information from the stream de-packetting processor 105 into the smart card 117 or DRAM 118, and is set into the low power consumption mode again after completion of the storage.

Therefore, the power consumption can be suppressed to minimum in the standby state and the watching and listening operation can be immediately started when the operation mode is changed from the standby state to the watching and listening state by storing mail information or EMM information necessary for the watching and listening operation in the smart card 117 or DRAM 118 in the standby state.

Further, the host processor 106 permits the stream de-packetting processor 105 to act as a bus master and maintains the low power consumption mode in the standby state and the stream de-packetting processor 105 directly writes EMM information or mail information into the DRAM 118 so that the power consumption of each circuit can be further suppressed in the standby state. Further, when the version of section data is updated, the same operation can be attained.

In a case where watching and listening record data stored in the smart card 117 is transferred to the center in the standby state, watching and listening record data can be transferred to the center while the power consumption is suppressed to minimum in the standby state and the center can collectively manage the watching and listening record data for the program by changing the mode of the host processor 106 from the low power consumption mode to the normal power mode, setting the power supplies of the modem 116 and smart card 117 in the ON state, reading out watching and listening record data from the smart card 117 and transferring the same to the center via the modem 116, and then setting the power supplies of the modem 116 and smart card 117 into the OFF state to set the low power consumption mode. Further, when watching and listening record data is stored in the DRAM 118, the host processor 106 may read out the watching and listening record data from the DRAM 118 and transfer the same to the center via the modem 116.

In the above embodiment, a case wherein EMM information or mail information is stored in the DRAM 118 is explained, but the information may be stored in the smart card 117. In this case, if the host processor 106 is informed that EMM information or mail information is received from the stream de-packetting processor 105 in the standby state, the mode thereof is changed from the low power consumption mode to the normal power mode and it turns ON the power supply of the smart card 117. Then, the host processor 106 transfers and stores EMM information or mail information from the stream de-packetting processor 105 into the smart card 117, turns OFF the power supply of the smart card 117 after completion of the storage, and then the mode thereof is returned to the low power consumption mode.

In the above embodiment, in a state in which the user dose not view a program and the power supply is turned OFF (the AC power supply is made active as it is), only the signal processing system containing the MPEG audio decoder 107, and MPEG video decoder 109 and the succeeding-stage circuits is set into the OFF state, and the signal processing system containing the stream de-packetting processor 105 and the preceding-stage circuits is fully operated and electricity is used wastefully. The following embodiment is made to solve this problem.

It is assumed in the following embodiment that information indicating the transmission period of EMM is contained in SI information and is transmitted from the transmission side for the power supply OFF state in which the user does not view the program. If the user stops watching the program and turns OFF the power supply on the receiver side, the built-in timer is set according to the next EMM acquiring timing based on the EMM transmission period information after EMM next transmitted is received and information is updated in a the host processor 106 and the power supply thereof and the power supply of the above signal processing system are turned OFF and the standby state is set. Then, if an ON instruction is issued at timing specified by the timer, the power supply thereof and the power supply of the above signal processing system are turned ON to start reception (wake up) and check the version of EMM. If the version is updated, EMM is updated, and if the version is not updated, the timer is set again. After this, the same operation is repeatedly effected to save electricity.

If EMM transmission period information is not contained in SI information on the transmission side, the EMM transmission period is derived on the receiver side during the operation of the receiving device, and when the standby state is set, time shorter than the EMM transmission period is set in the timer so as to stably acquire EMM although the efficiency is somewhat lowered.

Figure 10:
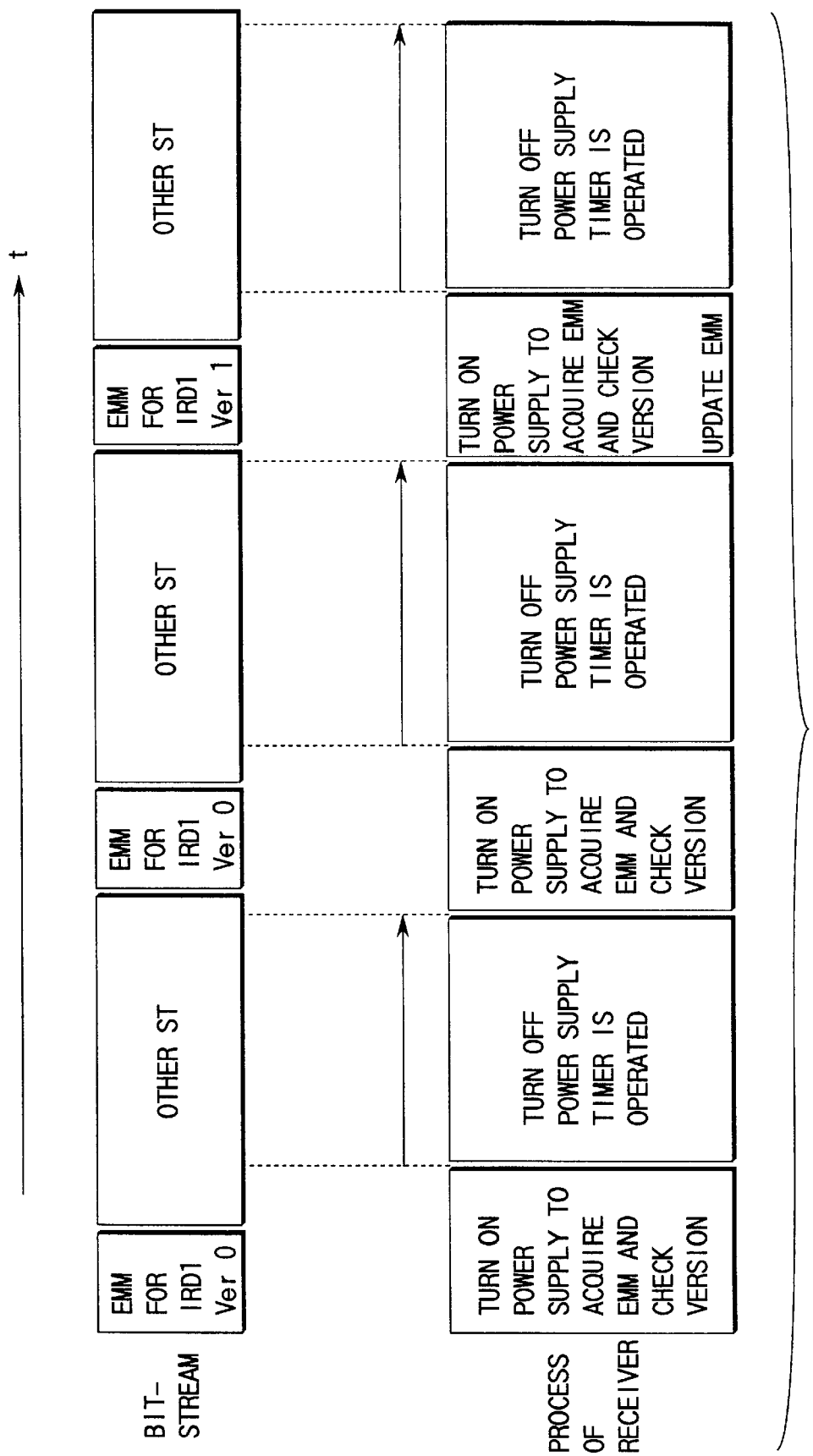
FIG. 10 is a timing diagram showing the flow of a process of a receiving device for a bit stream as another embodiment designed for attaining power saving.

When the viewer watches a program in the construction of FIG. 3, electricity is supplied to all of the circuits, but if the viewer stops watching the program and the receiving device is set into the standby state, the built-in timer is set to time immediately before the next EMM acquiring time based on the individual EMM acquiring period set up by the host processor 106 at the time of turn-ON of the power supply as shown in FIG. 10, and then the power supplies of all of the circuits are turned OFF and the standby mode is set. At the time set by the timer, wake-up is made to turn ON the power supplies of the system ranging from the antenna to the de-packetting processor 105, acquire EMM, subject the same to the updating process as required, then set the built-in timer again, and turn OFF the power supplies of all of the circuits. After this, the above operation is repeatedly effected until the receiving device is operated.

In a case where the host processor 106 is set into the standby mode, the bus which the host processor 106 takes charge of is open to the exterior circuit. That is, when the power supply is temporarily turned ON to acquire EMM, only the power supplies for the system ranging from the antenna to the de-packetting processor 105 and the DRAM 118 may be turned ON, and if EMM is received, the de-packetting processor 105 makes an interrupt so that the host processor 106 may be changed over from the standby state to the power supply ON state, then the version of the received EMM is checked, the EMM is updated if the version thereof is changed, the newly acquired EMM is discarded if the version thereof is not changed, and the host processor 106 is set into the standby state again. After issuance of the interrupt, the power supplies for the system ranging from the antenna to the de-packetting processor 105 are turned OFF.

As shown in FIG. 10, in order to correct an error of the transmission period according to the precision of the transmission period of EMM, time shorter than the detected transmission period is set in the timer and, when the time set has elapsed, the power supplies for the system ranging from the antenna to the de-packetting processor 105 are controlled to be turned ON. In a case where the viewer turns OFF the power supply of the receiving device when EMM is received, the above operation is repeatedly effected so as to always acquire the newest EMM. In order to acquire individual EMM, various other table data may be acquired and stored into the DRAM 118 until EMM is acquired and updated when the power supplies for the system ranging from the antenna to the de-packetting processor 105 and containing the DRAM 118 are set in the ON state.

Figure 11:
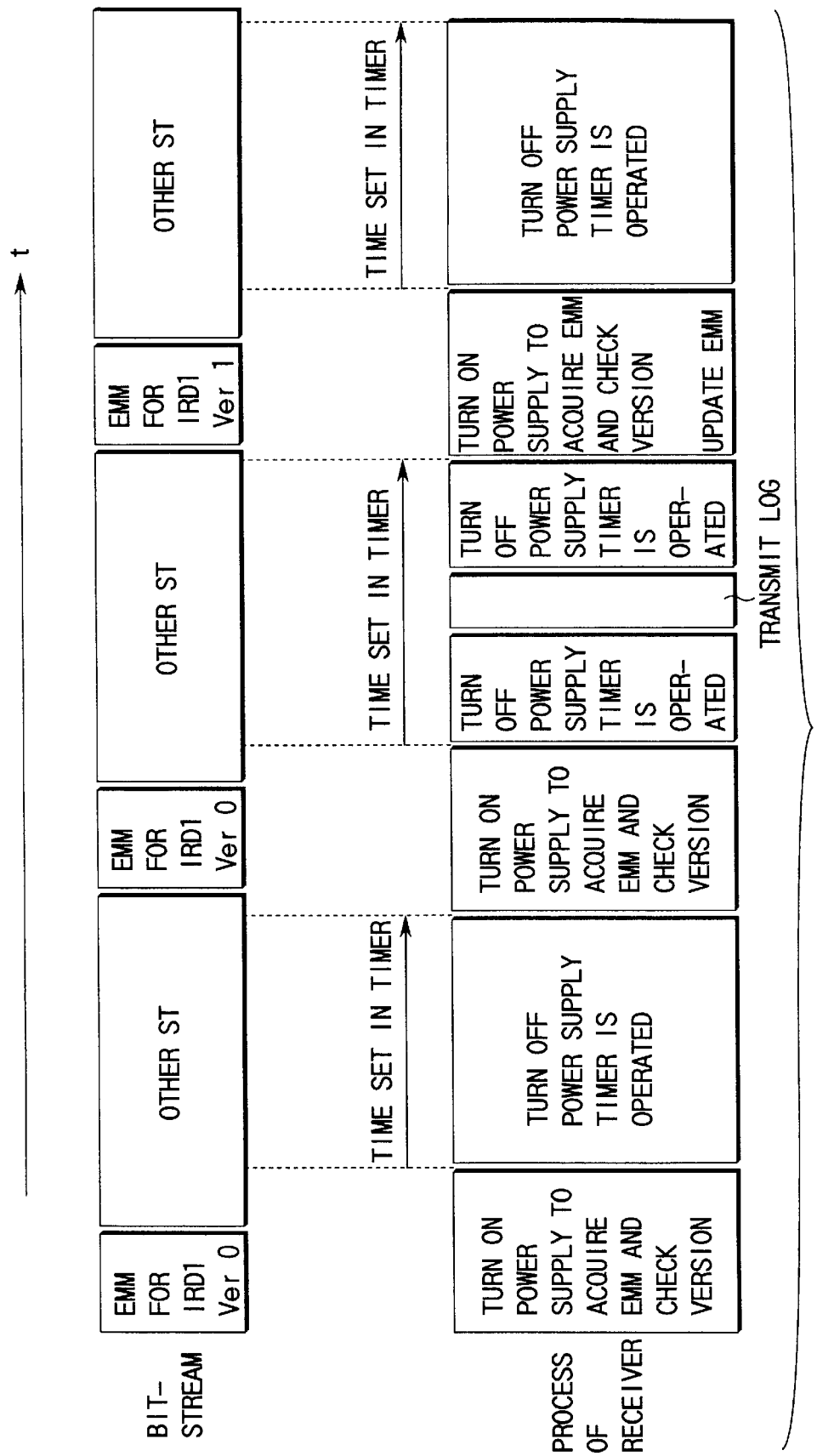
FIG. 11 is a timing diagram showing the flow of a process of the receiving device when a log is transmitted in the standby state in the above embodiment.

FIG. 11 shows the operation in a case where a log watched at time other than the time set by the timer is transmitted to the broadcasting station side. When the watched log is transmitted, the power supplies for the host processor 106 and modem are turned ON, but at this time, the timer is not reset and next EMM is received with the period kept unchanged. When the receiving device is turned ON irrespective of the timer, remaining time to the time when the receiving device is next turned OFF may be set into the timer so as to attain the same effect.

Next, the concrete process flow is explained.

Figure 12:
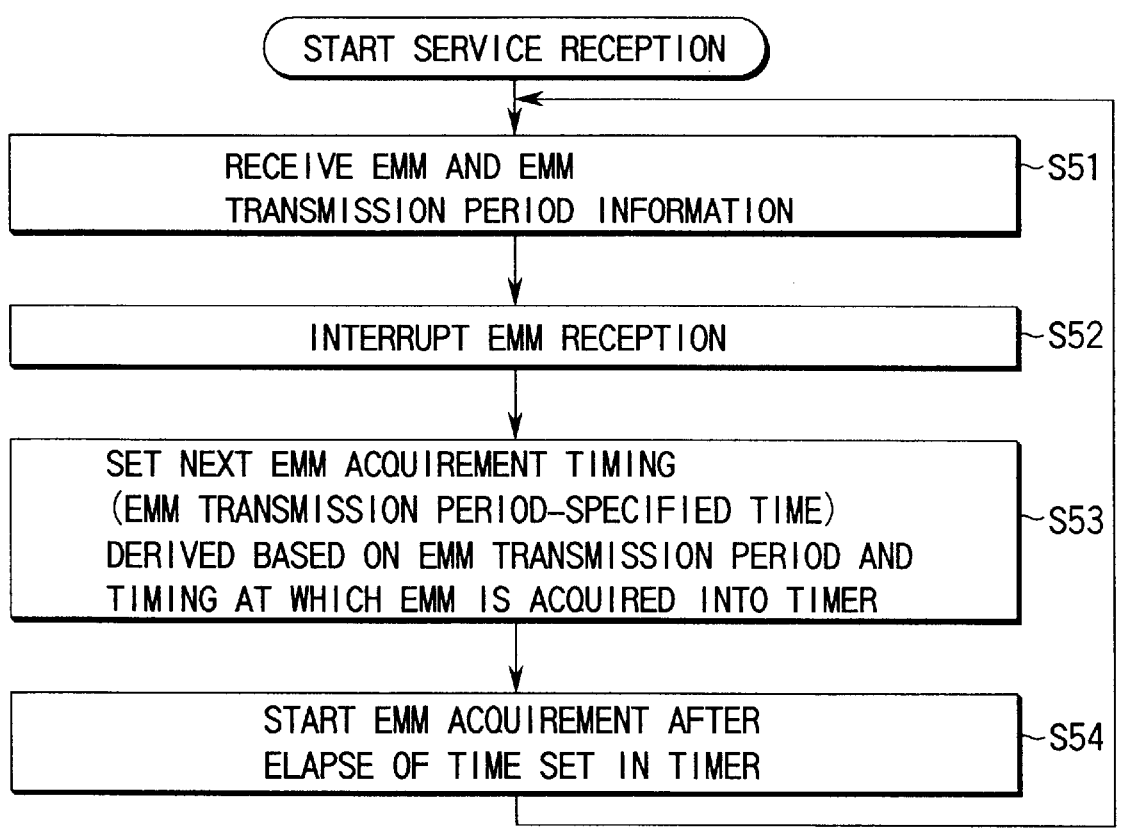
FIG. 12 is a flowchart showing the flow of a whole process in the above embodiment.

FIG. 12 shows the flow of the whole process by taking it into consideration that the transmission period information is broadcast together with EMM information on the broadcasting station side. When service reception is started, EMM and EMM transmission period information are received (step S51), and after interruption of EMM reception (step S52), next EMM acquirement timing (EMM transmission period–specified time) is calculated based on the EMM transmission period and the timing at which the EMM is received and set into the timer (step S53). After elapse of time set in the timer, wake-up is made to start receiving EMM (step S54) and then the process of the step S51 is effected again.

The above process has a feature that the EMM receiving timing is determined based on the timing at which the EMM is received and EMM transmission period information and the state for receiving EMM is set up at the time earlier than the time at which EMM is transmitted by the specified time.

Figure 13:
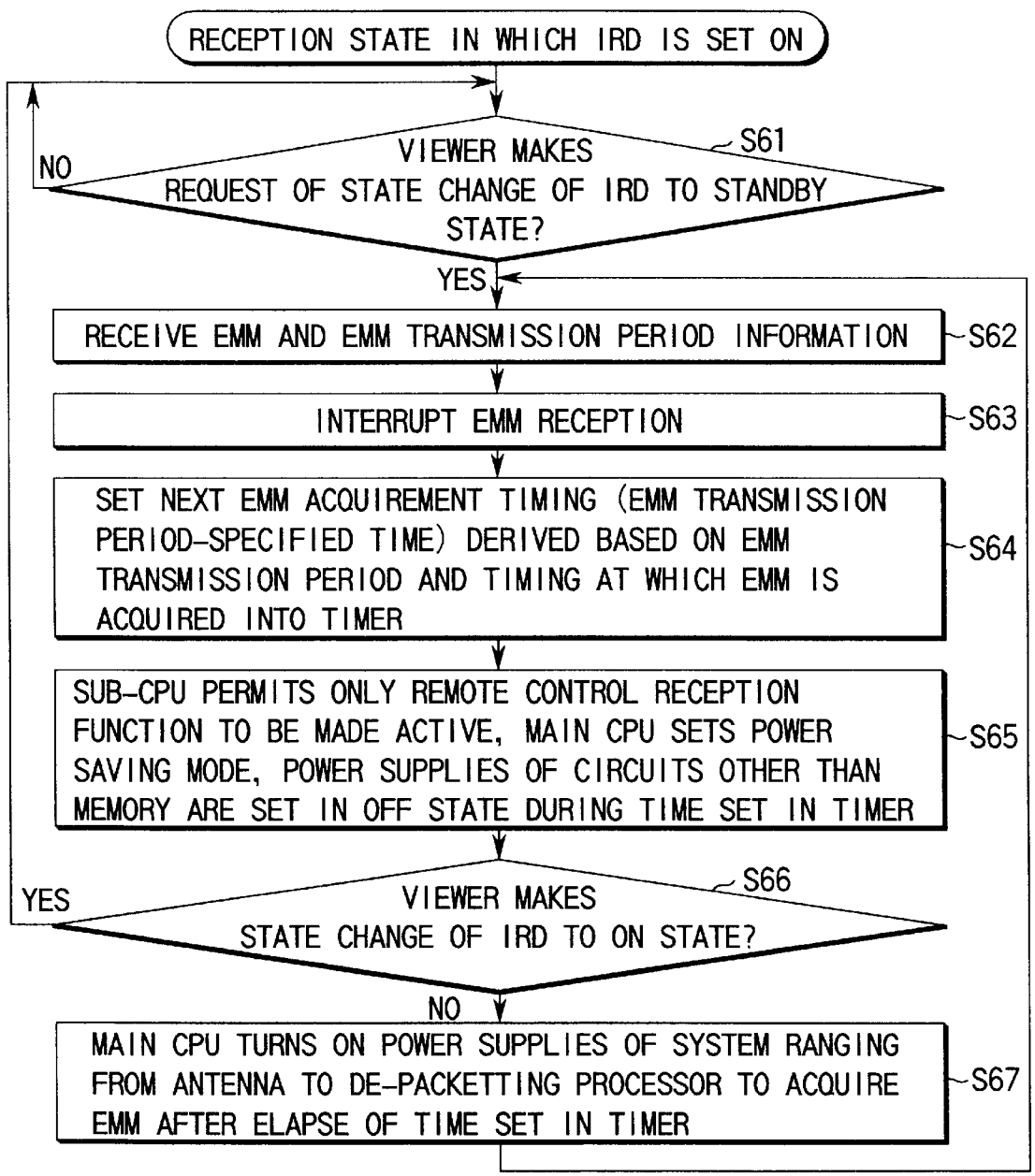
FIG. 13 is a flowchart showing the flow of a concrete process in the above embodiment.

FIG. 13 shows the flow of a process containing the control for the power supply when the receiving device is set into the standby state. First, when the receiving device (IRD) is turned ON and set into the reception state, whether or not the viewer makes a request of the state change to the standby state is checked (step S61). If the request is made, EMM and EMM transmission period information are received (step S62), and after interruption of EMM reception (step S63), next EMM acquirement timing (EMM transmission period–specified time) is calculated based on the EMM transmission period and the timing at which the EMM is received and set into the timer (step S64). During the time set in the timer, the sub-CPU 114 permits only the remote control reception function to be made active, the main CPU (host processor 106) sets the power saving mode, the power supplies of the circuits other than the memory (DRAM 118) are turned OFF (step S65).

Whether or not the viewer has changed the IRD to the ON state is checked in this state (step S66), if the change to the ON state is made, the step S61 is effected again, and if no change is made, the main CPU (host processor 106) turns ON the power supplies for the system ranging from the antenna to the de-packetting processor 105 to acquire EMM after elapse of time set in the timer (step S67), and then the step S62 is effected again.

The above process has a feature that the whole circuits of the IRD are made active only during the EMM reception period when the viewer sets the IRD into the standby state and the circuits except the circuit for managing time are not made active in the other time. Particularly, the process has a feature that no electricity is supplied to the antenna while the viewer sets the IRD into the standby state and electricity is supplied to the antenna only during EMM reception in a case where the IRD supplies electricity to the antenna.

Figure 14:
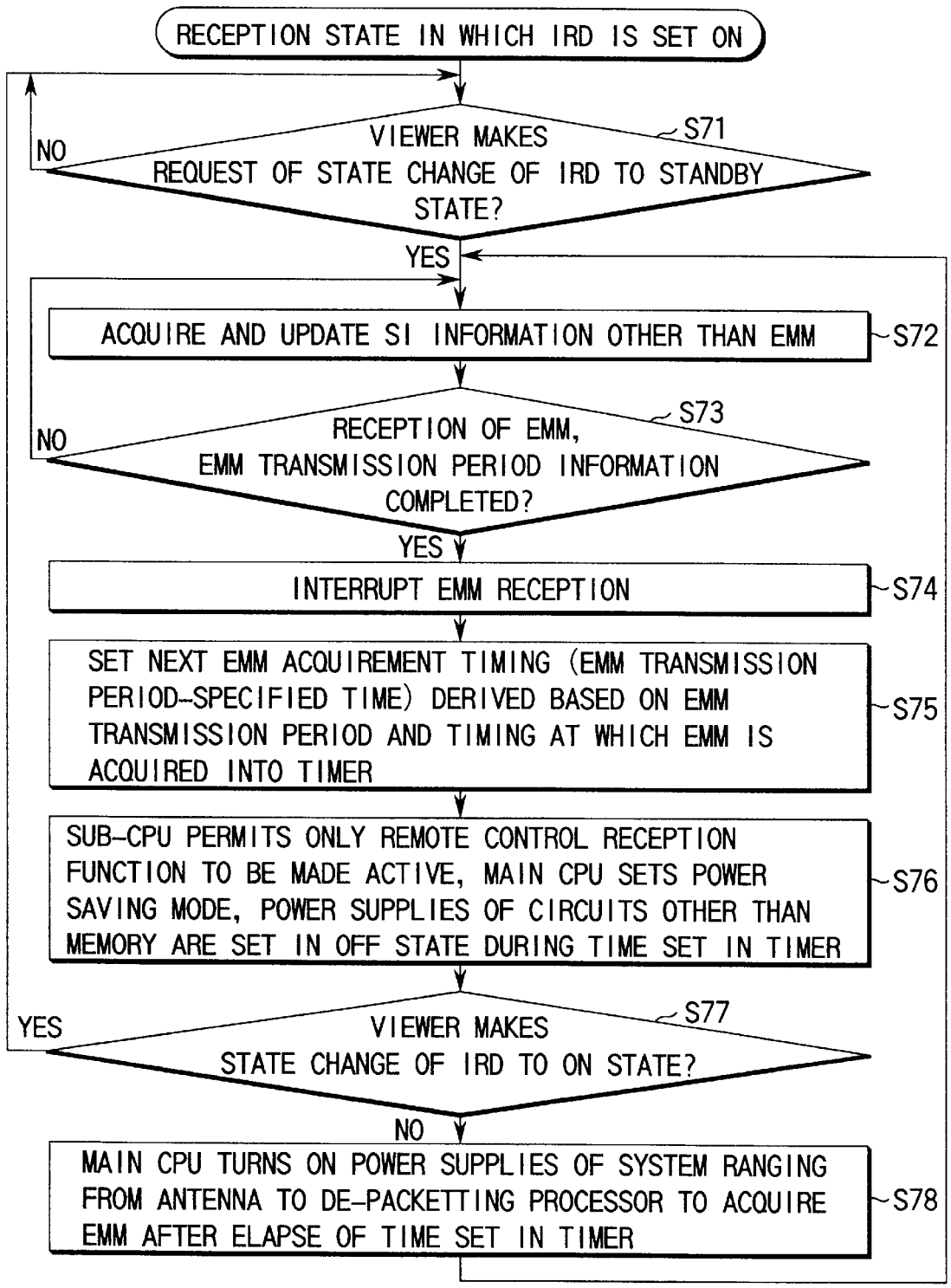
FIG. 14 is a flowchart showing the flow of another concrete process in the above embodiment.

FIG. 14 shows the flow of the process in a case where other SI information is acquired at the time of EMM acquirement in the standby state and the information is held in addition to the function shown in FIG. 13. First, when the receiving device (IRD) is turned ON and set into the reception state, whether or not the viewer makes a request of the state change to the standby state is checked (step S71). If the request is made, acquirement and updating of SI information other than EMM are effected (step S72) and whether reception of EMM and EMM transmission period information is completed or not is checked (step S73).

If the reception is not completed, the step S72 is effected again, and if the reception is completed, interruption of EMM reception is made (step S74) and then next EMM acquirement timing (EMM transmission period-specified time) is calculated based on the EMM transmission period and the timing at which the EMM is received and set into the timer (step S75). During the time set in the timer, the sub-CPU 114 permits only the remote control reception function to be made active, the main CPU (host processor 106) sets the power saving mode, the power supplies of the circuits other than the memory (DRAM 118) are turned OFF (step S76).

Whether or not the viewer has changed the IRD to the ON state is checked in this state (step S77), if the change to the ON state is made, the step S71 is effected again, and if no change is made, the main CPU (host processor 106) turns ON the power supplies for the system ranging from the antenna to the de-packetting processor 105 to acquire EMM after elapse of time set in the timer (step S78), and then the step S72 is effected again.

The above process has a feature that the whole circuits of the IRD are made active only during the EMM reception period when the viewer sets the IRD into the standby state and other SI information is also acquired and stored into the memory for holding information until EMM is acquired.

Figure 15:
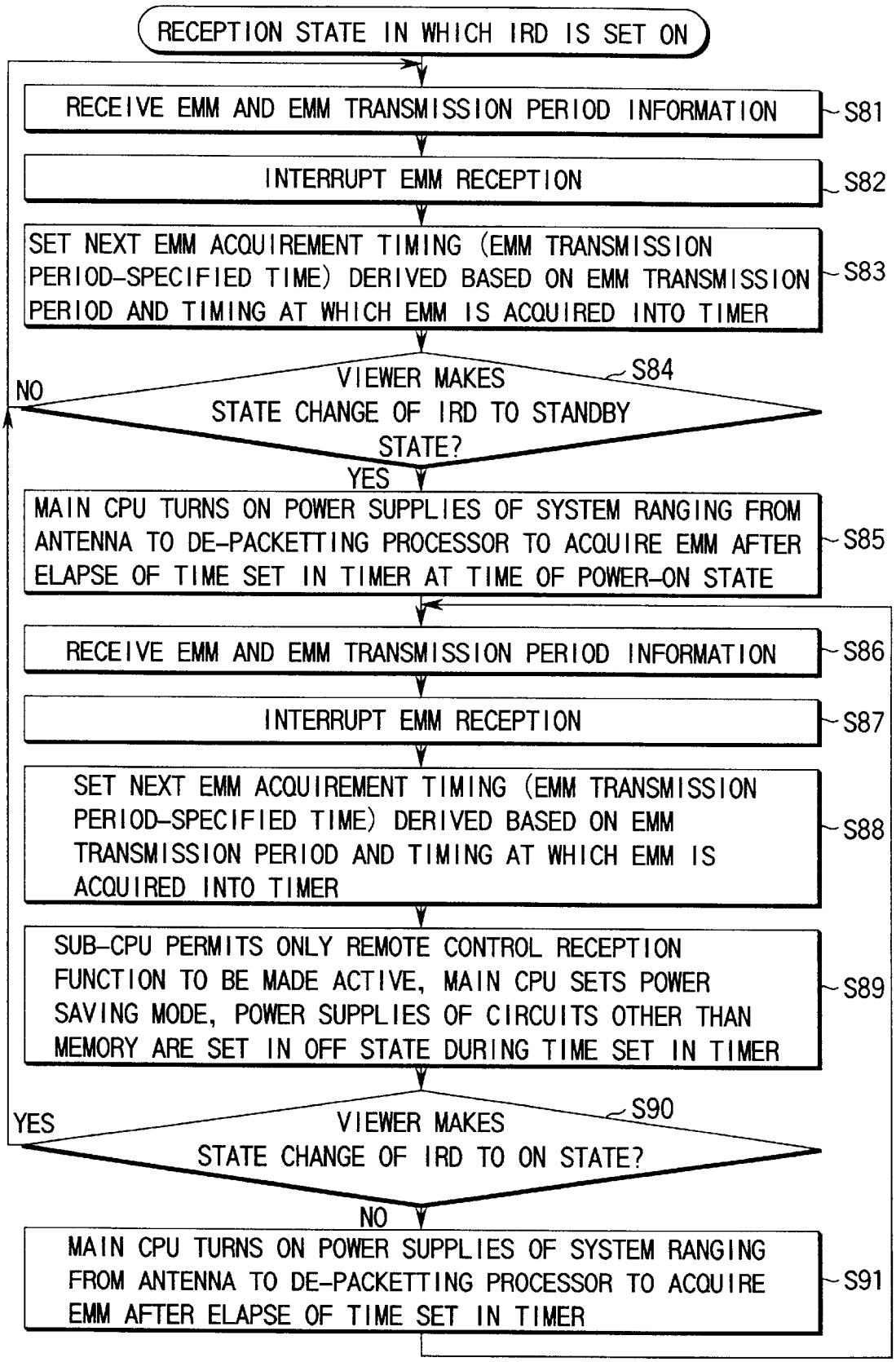
FIG. 15 is a flowchart showing the flow of still another concrete process in the above embodiment.

FIG. 15 shows another example of the process. First, when the IRD is turned ON and set into the reception state, EMM and EMM transmission period information are received (step S81), and after interruption of EMM reception (step S82), next EMM acquirement timing (EMM transmission period-specified time) is calculated based on the EMM transmission period and the timing at which the EMM is received and set into the timer (step S83).

At this time, whether or not the viewer has changed the IRD to the standby state is checked (step S84), if no change is made, the step S81 is effected again, and if the change is made, the main CPU (host processor 106) turns ON the power supplies for the system ranging from the antenna to the de-packetting processor 105 to acquire EMM (step S85) after elapse of time set in the timer when the power supply is turned ON. In this state, EMM and EMM transmission period information are received (step S86), and after interruption of EMM reception (step S82), next EMM acquirement timing (EMM transmission period-specified time) is calculated based on the EMM transmission period and the timing at which the EMM is received and set into the timer (step S88). During the time set in the timer, the sub-CPU 114 permits only the remote control reception function to be made active, the main CPU (host processor 106) sets the power saving mode, the power supplies of the circuits other than the memory (DRAM 118) are turned OFF (step S89).

At this time, whether or not the viewer has changed the IRD to the ON state is checked (step S90), if the change to the ON state is made, the step S81 is effected again, and if no change is made, the main CPU (host processor 106) turns ON the power supplies for the system ranging from the antenna to the de-packetting processor 105 to acquire EMM (step S91) after elapse of time set in the timer and the step S86 is effected again.

The above process has a feature that EMM reception is repeatedly effected in the extracted EMM transmission period also when the viewer watches the program by use of the IRD, and in a case where the viewer once sets the IRD into the standby state and the viewer turns OFF the power supply of the IRD and then turn ON the same for permitting the broadcasting station to fetch the watching and listening record, EMM is acquired during the ON period.

Figure 16:
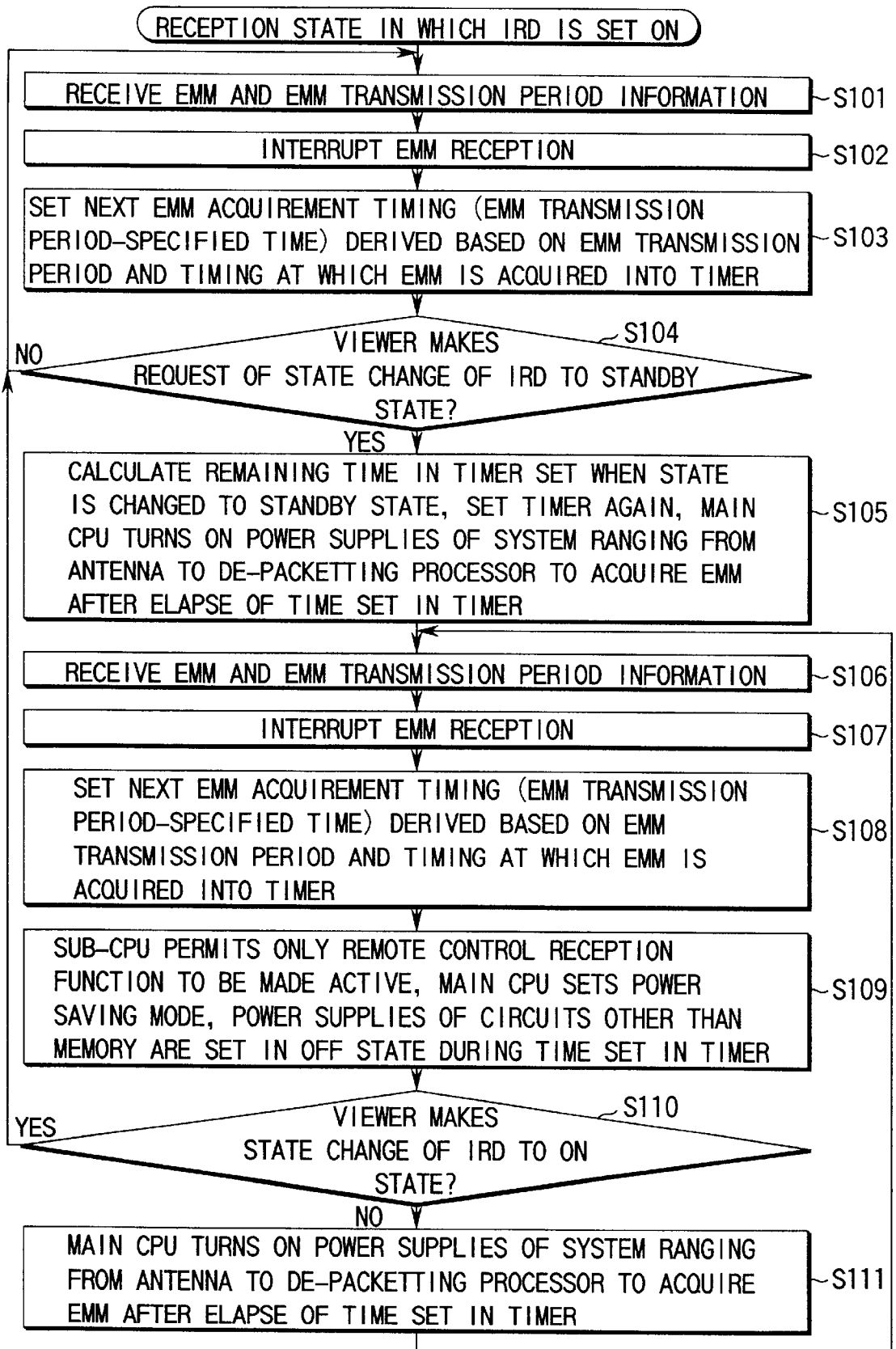
FIG. 16 is a flowchart showing the flow of another concrete process in the above embodiment.

FIG. 16 shows still another example of the process. First, when the IRD is turned On and set into the reception state, EMM and EMM transmission period information are received (step S101), and after interruption of EMM reception (step S102), next EMM acquirement timing (EMM transmission period-specified time) is calculated based on the EMM transmission period and the timing at which the EMM is received and set into the timer (step S103).

At this time, whether or not the viewer has changed the IRD to the standby state is checked (step S104), if no change is made, the step S101 is effected again, and if the change is made, remaining time of the time set in the timer set when the change is made to the standby state is calculated, the timer is set again, and after elapse of time set in the timer, the main CPU (host processor 106) turns ON the power supplies for the system ranging from the antenna to the de-packetting processor 105 to acquire EMM (step S105).

In this state, EMM and EMM transmission period information are received (step S106), and after interruption of EMM reception (step S107), next EMM acquirement timing (EMM transmission period-specified time) is calculated based on the EMM transmission period and the timing at which the EMM is received and set into the timer (step S108). During the time set in the timer, the sub-CPU 114 permits only the remote control reception function to be made active, the main CPU (host processor 106) sets the power saving mode, the power supplies of the circuits other than the memory (DRAM 118) are turned OFF (step S109).

At this time, whether or not the viewer has changed the IRD to the ON state is checked (step S110), if the change to the ON state is made, the step S101 is effected again, and if no change is made, the main CPU (host processor 106) turns ON the power supplies for the system ranging from the antenna to the de-packetting processor 105 to acquire EMM (step S91) after elapse of time set in the timer and then the step S106 is effected again.

The above process has a feature that EMM reception is repeatedly effected in the extracted EMM transmission period also when the viewer watches the program by use of the IRD, and in a case where the viewer changes the IRD into the standby state or the power supply of the IRD is once turned ON and then turned OFF according to the change for permitting the broadcasting station to fetch the watching and listening record or the like, time set in the timer is adequately changed based on the timing at which the IRD is turned OFF and the period in which EMM is received so as to acquire EMM. At this time, the IRD is made active, then time is set in the timer based on the EMM reception timing and the EMM transmission period information, and after elapse of the set time, EMM reception is effected and the circuits except the circuit for managing time are not made active in the other time.

This invention is not limited to the above embodiment and this invention can be variously modified without departing from the technical scope thereof.

As described above, according to this invention, there is provided a digital broadcast receiving device in which added information can be updated while the power consumption is suppressed to minimum in the standby state at the time of reception of digital broadcast in which added information is periodically updated and the watching and listening operation can be rapidly started when the operation state is changed from the standby state to the watching and listening state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital broadcast receiving device comprising:
 a first processor for extracting at least updating information for selecting a program, or added information containing mail information or information for watching and listening to a program and multiplexed on a digital broadcast signal from the digital broadcast;
 first storage means for storing the added information or updating information; and
 a second processor having a low power consumption mode and a normal power mode, for effecting the circuit control for the watching and listening operation according to a preset program and the added information or updating information;
 wherein said first processor extracts the added information or updating information which meets a predetermined filter condition from the digital broadcast signal and informs said second processor that the added information or updating information is extracted, and said second processor is set into the low power consumption mode when the device is set in the standby state, and is changed into the normal power mode from the low power consumption mode when it is informed from said first processor that the added information or updating information is extracted, then said second processor transfers and writes the added information or updated information extracted by said first processor into said first storage means after the mode thereof is changed into the normal power mode, and is returned to the lower power consumption mode again after the writing operation of the added information or updating information is completed.

2. A digital broadcast receiving device according to claim 1, wherein said first storage means is a memory card used for watching and listening to a program, a power supply thereof is selectively turned ON/OFF by said second processor in a state in which said second processor is set in the normal power mode, and the added information or updating information can be written when the power supply thereof is set in the ON state.

3. A digital broadcast receiving device according to claim 1, further comprising second storage means for storing watching and listening record information; and transmitting means for transmitting the watching and listening record information to a center;
 wherein said second processor changes the mode thereof from the lower power consumption mode to the normal power mode, sets the power supply of said transmitting means in the ON state, reads out the watching and listening record information from said second storage means, transmits the watching and listening record information to the center via said transmitting means, then sets the power supply of said transmitting means in the OFF state and the mode thereof is set into the low power consumption mode again in a case where the watching and listening record information is transmitted to the center while the device is set in the standby state.

4. A digital broadcast receiving device according to claim 3, wherein said second storage means is a memory card used for storing the watching and listening record information, a power supply thereof is selectively turned ON/OFF by said second processor in a state in which said second processor is set in the normal power mode, and set into the ON state to permit the watching and listening record information to be readout when the watching and listening record information is transmitted to the center, and set into the OFF state after the watching and listening record information is transmitted to the center.

5. A digital broadcast receiving device comprising:
 a first processor for extracting at least updating information for selecting a program, or added information containing mail information or information for watching and listening to a program and multiplexed on a digital broadcast signal from the digital broadcast;
 first storage means for storing the added information or updating information; and
 a second processor having a lower power consumption mode and a normal power mode, for effecting the circuit control for the watching and listening operation according to a preset program and the added information or updating information;
 wherein said second processor permits said first processor to write the added information or updating information when it is set into the standby state and the mode thereof is set in the low power consumption mode, and said first processor accesses said first storage means based on the write permission to said first storage means given by said second processor and transfers and writes the added information or updating information extracted from the digital broadcast signal into said first storage means.

6. A digital broadcast receiving device according to claim 5, wherein said first storage means is a semiconductor memory into which the added information or updating information can be written.

7. A digital broadcast receiving device comprising:
 a first processor for extracting at least updating information for selecting a program, or added information containing mail information or information for watching and listening to a program and periodically multiplexed on a digital broadcast signal from the digital broadcast;
 first storage means for storing the added information or updating information; and
 a second processor having a low power consumption mode and a normal power mode, for effecting the circuit control for the watching and listening operation according to a preset program and the added information or updating information;
 wherein said first processor extracts timing information and the added information or updating information which meets a predetermined filter condition from the digital broadcast signal, informs said second processor that the added information or updating information is extracted and transmits the timing information to said second processor, and said second processor has a timer for informing that preset time after turn-OFF time has elapsed and repeatedly effects a process for calculating time at which next added information or updating information is transmitted based on the timing information obtained in the operative state of the receiving device, setting the calculated time into said timer, acquiring the added information or updating information when it is informed that the time set in said timer has elapsed, then calculating time at which next added information or updating information is transmitted, and setting the calculated time into said timer.

8. A digital broadcast receiving device according to claim 7, wherein said second processor causes the receiving of the added information or updating information during a period in which the added information or updating information is received when the broadcast receiving device is set in the standby state and causes various other elements of the broadcast receiving device to be non-active.

9. A digital broadcast receiving device according to claim 7, wherein said second processor supplies power to an antenna for receiving the added information or updating information active during a period in which the added information or updating information is received when the receiving device is set in the standby state and sets the antenna in the non-power supply state in the other period.

10. A digital broadcast receiving device according to claim 7, wherein said second processor acquires other service information during a period in which the added information or updating information is received and stores the acquired service information into said first storage means when the receiving device is set in the standby state.

11. A digital broadcast receiving device according to claim 7, further comprising second storage means for storing watching and listening record information; and transmitting means for transmitting the watching and listening record information to a center;

wherein said second processor calculates time to be set into said timer by taking into consideration a period for reading out watching and listening record information from said second storage means and transmitting the watching and listening record information to the center via said transmitting means when a watching and listening record information request signal is extracted.

12. A digital broadcast receiving device according to claim 11, wherein said second processor makes active said second storage means and said transmitting means only in a period for transmission of the watching and listening record information when the receiving device is set in the standby state and makes non-active said second storage means and said transmitting means in the other period.

\* \* \* \* \*